No. 641,064. Patented Jan. 9, 1900.
W. S. ANDERSON.
COMBINED ASH BOX AND SHOVEL.
(Application filed May 4, 1899.)
(No Model.)
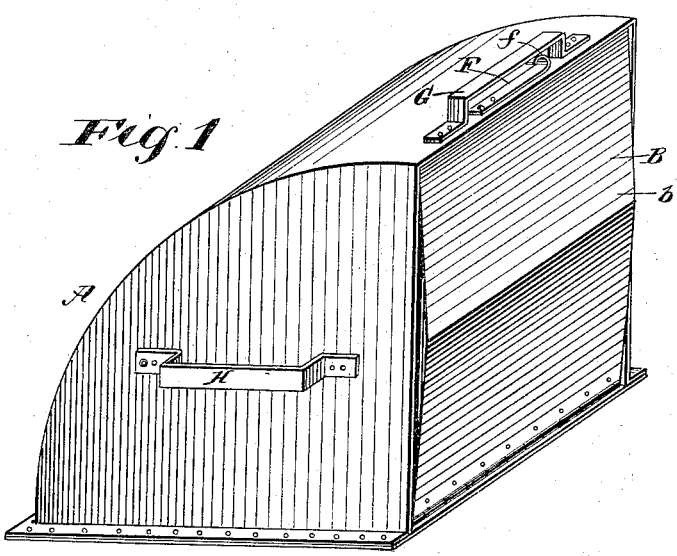
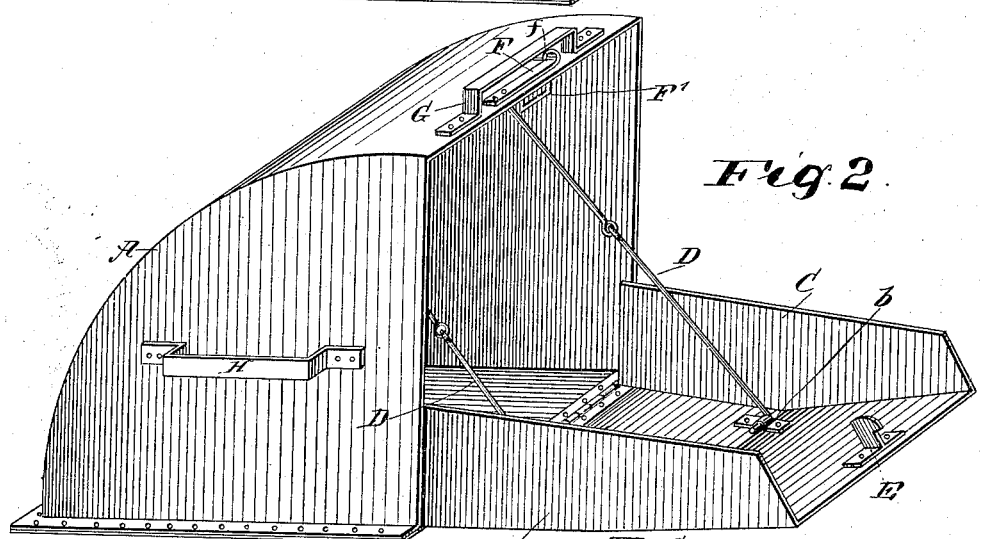
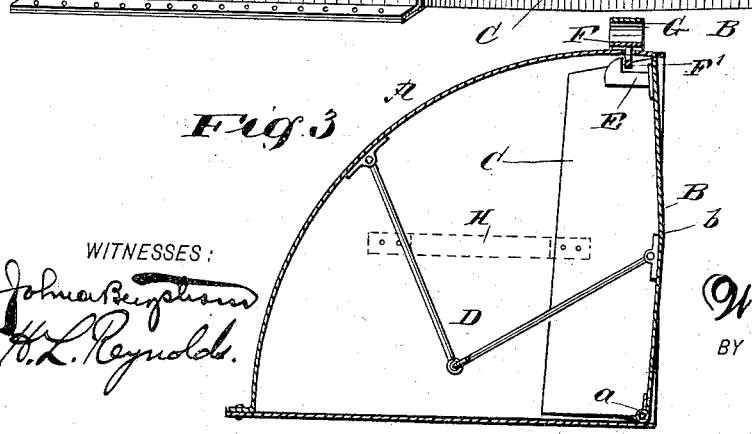
WITNESSES: INVENTOR
W. S. Anderson
BY
ATTORNEYS.

UNITED STATES PATENT OFFICE.

WILLIAM SENSENEY ANDERSON, OF JASPER, TENNESSEE.

COMBINED ASH-BOX AND SHOVEL.

SPECIFICATION forming part of Letters Patent No. 641,064, dated January 9, 1900.

Application filed May 4, 1899. Serial No. 715,562. (No model.)

*To all whom it may concern:*

Be it known that I, WILLIAM SENSENEY ANDERSON, of Jasper, in the county of Marion and State of Tennessee, have invented a new and Improved Combined Ash-Box and Shovel, of which the following is a full, clear, and exact description.

My invention relates to an improvement in devices for taking up and carrying ashes, &c.; and it consists of a combined ash-box and shovel constructed of iron, steel, or other incombustible material.

Reference is to be had to the accompanying drawings, forming a part of this specification, in which similar characters of reference indicate corresponding parts in all the views.

Figure 1 is a perspective view of my device closed. Fig. 2 is a perspective view of the device opened in condition for receiving the ashes, and Fig. 3 is a sectional elevation of the device closed.

My invention comprises a box A, which in its preferred form is in cross-section a quadrant of a circle, one side B of the box being hinged at the center of the quadrant, so that it may swing downward and adapt it to form the shovel. This side B has a flange C extending upward from each side edge, the outer or end edge being without a flange.

The bottom of the shovel B is preferably bent at the point b, as shown in the drawings, the upper side being substantially concave. This bend in the bottom enables the device to be more conveniently used in many ways than if it were straight, as the outer edge of the shovel B may be kept close down to the hearth, while the box is held slightly above the hearth by the handles H H on the box A. The width of the shovel will be made to correspond to the space within which it is to be inserted, and the depth of the flanges C will also correspond with the space between the grates and the hearth. The hinge a for the shovel B is a continuous hinge extending from one side of the shovel to the other.

The downward drop of the shovel is limited by pivoted links D, which are connected to the box and the shovel and which close within the box when the shovel is raised. The shovel is held in its upper position by means of a spring-catch formed of a spring-hook F on top of the ash-box and a catch-bar E secured to the outer end of the shovel. The spring-bar F has a loop or extension F' within the box and a hook f formed on its outer free end and by means of which it may be grasped by the finger and lifted to release the catch E.

The box, as herein shown, is provided with three handles, two handles H being located one at each end of the box and the third handle G being located at the top of the box or the point which is nearest to the end of the shovel when the same is closed.

In using my device I grasp the handle on top of the box, insert the index-finger in hook f on the free end of the spring-bar F under the handle, and raise the same. This will release the shovel, and it will fall downward and outward. The device is then placed in front of the ashes, dust, or other substance to be taken up or removed and is then pushed forward, by means of the handles H on the ends of the box, beneath the ashes, dirt, dust, or other substance to be taken up or removed, or such substance may be drawn upon it until the shovel has been filled. The shovel is then drawn outward, if necessary, to clear it of any overhanging obstruction, like a grate, and the box is swung forward over the shovel until the catch E is caught by the spring-bar F. The box is then turned back, lifting the shovel with it and dropping the ashes, dirt, dust, or other substance to be removed into the body of the box. It is then picked up by the handle G on top of the box and carried out to where the ashes, &c., are to be dumped. I insert the index-finger again in the hook on the free end of the spring-bar F under the handle G on top of the box, and the shovel will open and fall outward, readily emptying the contents of the box. It will be seen that the contents of the box are kept entirely covered, inclosed within the box, and there is no chance for dust or sparks of fire to escape into the room or hallways or open spaces through which it is carried, nor is dust created or caused to fly by the operation of my device in taking up ashes, for which purpose it is chiefly intended, as is common in the ordinary way of taking up ashes, in which the ashes are repeatedly disturbed in filling the shovel and emptying the same into a separate vessel. The shovel of my device when once full is immediately covered and secured by turning the box A forward over the shovel B.

Having thus fully described my invention, I claim as new and desire to secure by Letters Patent—

1. A combined ash-box and shovel, consisting of a box having one side hinged thereto to drop downward and adapted to act as a shovel, the side edges of said side having integral upturned flanges, and pivoted links connecting the box and shovel and limiting the outward swing of said shovel.

2. A combined ash-box and shovel, comprising a box in cross-section the quadrant of a circle, one of the flat sides being hinged at the center of the quadrant and having its side edges turned up to form a shovel, pivoted links connecting the box and shovel and limiting the outward drop of the shovel, a spring-catch holding the shovel when closed in the box, and a handle upon the edge adjacent the outer end of the shovel when closed.

3. A combined ash-box and shovel, consisting of a box having one side hinged thereto and adapted to act as a shovel, the bottom of said shovel being bent intermediate its ends.

WILLIAM SENSENEY ANDERSON.

Witnesses:
   A. L. PITTS,
   T. A. WILLIAMS.